(No Model.)
G. FREDERICKS & P. J. ARBEITER.
ADVERTISING DEVICE.
No. 582,633. Patented May 18, 1897.
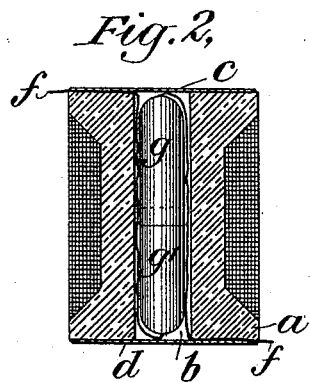
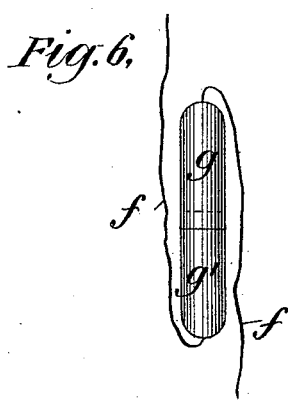
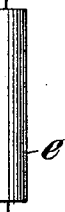
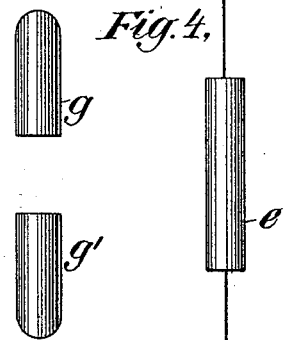
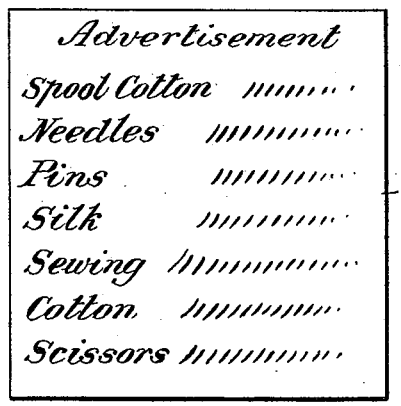
WITNESSES:
INVENTORS.
George Fredericks
Peter J. Arbeiter
BY
ATTORNEYS.

UNITED STATES PATENT OFFICE.

GEORGE FREDERICKS AND PETER JOSEPH ARBEITER, OF NEW YORK, N. Y.

ADVERTISING DEVICE.

SPECIFICATION forming part of Letters Patent No. 582,633, dated May 18, 1897.

Application filed January 13, 1896. Serial No. 575,205. (No model.)

*To all whom it may concern:*

Be it known that we, GEORGE FREDERICKS and PETER JOSEPH ARBEITER, citizens of the United States, and residents of New York, in the county of New York and State of New York, have invented certain new and useful Improvements in Advertising Devices, of which the following is a specification.

We have conceived the novel idea of utilizing the spools of cotton, silk, or other kinds of thread as a conveyer of advertising matter to the consumer of the thread and we have devised the following means for reducing this idea to practice.

In the accompanying drawings, Figure 1 is an end view of a spool of cotton containing our invention. Fig. 2 is a longitudinal section of the same. Fig. 3 is a sheet of advertising matter. Fig. 4 is the same rolled up in proper form to be combined with the spool. Fig. 5 is two parts of the capsule that may be employed for containing said roll, and Fig. 6 is such capsule in condition to be inserted in the spool.

$a$ is a spool of cotton, silk, or other thread containing the usual hole $b$. Said hole is closed at opposite ends by the usual labels $c$ and $d$.

$e$ is a sheet of advertising matter upon which may be printed anything desired and which is rolled up in the form shown in Fig. 4, and is preferably provided with a thread $f$, running longitudinally through the roll, as shown. Before the labels are placed upon the spool this roll $e$ is inserted endwise into the hole $b$ of the spool. The ends of the thread $f$ are laid across the ends of the spool and the labels are pasted onto the ends of the spool over such thread ends and so as to inclose the roll $e$ within the hole $b$. The ends of the thread $f$ are allowed to project laterally beyond the edges of the labels, as shown.

We prefer, before inserting the roll $e$ within the spool, as above described, to inclose it within a case, such as a capsule made of gelatin or any other suitable cheap material, composed of the two telescoping parts $g$ $g'$, so that when combined with the roll $e$, within and before insertion into the spool, said capsule will be, as shown in Fig. 6, provided with threads $f$, projecting from the ends of the spool. When this capsule is placed within the hole $b$ of the spool, the ends of the thread will preferably be as shown in Fig. 2, where each end of thread returns through the hole of the spool outside of the capsule and is then led across the end of the spool and covered by the label which also covers the end of the capsule.

When the article of manufacture, consisting of the spool combined with the advertising matter, as before described, is placed upon the spindle of a sewing-machine for the purpose of consuming the thread, the spindle as it enters the hole of the spool will force the advertising matter (the roll $e$, whether it be inclosed or uninclosed by the capsule) out of the hole at the opposite end in such manner that it cannot escape the attention of the person consuming the thread, whose curiosity will prompt her to open the roll and examine the advertising matter.

If the thread upon the spool be consumed without using it in a sewing-machine, the projecting ends of the thread $f$ will be calculated to attract attention and lead to the advertising matter being pulled out of the hole in the spool.

We claim—

1. The combination with a spool of thread having a longitudinal hole through its center closed with end labels of advertising matter contained within the inclosure so formed; said spool-hole being adapted to fit the spindle of a sewing-machine, the insertion of which will eject said advertising matter substantially as described.

2. The combination with a spool of thread having a longitudinal hole through its center closed with end labels of advertising matter contained within the inclosure so formed and a thread attached thereto projecting outside of said closure and held in place by an end label; said spool-hole being adapted to fit the spindle of a sewing-machine, the insertion of which will eject said advertising matter substantially as described.

3. The combination with a spool of thread having a longitudinal hole through its center closed with end labels of advertising matter inclosed in a case and contained within the closure formed by the end labels; said spool-hole being adapted to fit the spindle of a sewing-machine, the insertion of which will eject said advertising matter substantially as described.

4. The combination with a spool of thread having a longitudinal hole through its center, of labels closing said hole, a roll of advertising matter and means for confining said roll contained within said hole between said labels; said spool-hole being adapted to fit the spindle of a sewing-machine the insertion of which will eject said roll, substantially as described.

GEORGE FREDERICKS.
PETER JOSEPH ARBEITER.

Witnesses:
M. WILSON,
C. J. RATHJEN.